(12) United States Patent
Park et al.

(10) Patent No.: US 11,816,091 B2
(45) Date of Patent: Nov. 14, 2023

(54) METHOD AND APPARATUS FOR TRACKING DIGITAL CONTENT TRANSFER

(71) Applicant: N-TUPLE. CO. LTD, Seoul (KR)

(72) Inventors: Hyun Min Park, Seoul (KR); Ho Gyu Lee, Seoul (KR)

(73) Assignee: N-TUPLE. CO. LTD., Seoul (KR)

( * ) Notice: Subject to any disclaimer, the term of this patent is extended or adjusted under 35 U.S.C. 154(b) by 0 days.

(21) Appl. No.: 17/055,904

(22) PCT Filed: May 15, 2019

(86) PCT No.: PCT/KR2019/005815
§ 371 (c)(1),
(2) Date: Nov. 16, 2020

(87) PCT Pub. No.: WO2019/221501
PCT Pub. Date: Nov. 21, 2019

(65) Prior Publication Data
US 2021/0191920 A1    Jun. 24, 2021

(30) Foreign Application Priority Data

May 17, 2018  (KR) ........................ 10-2018-0056359

(51) Int. Cl.
  *G06F 16/23*  (2019.01)
  *H04L 9/40*   (2022.01)
(52) U.S. Cl.
  CPC .......... *G06F 16/2365* (2019.01); *H04L 63/08* (2013.01)

(58) Field of Classification Search
  CPC . G06F 16/2365; H04L 63/08; H04L 63/0876; H04L 29/06; H04L 43/10; H04L 63/10; H04L 67/22
  See application file for complete search history.

(56) References Cited

U.S. PATENT DOCUMENTS

2009/0063629 A1  3/2009 Jeong et al.
2017/0046806 A1* 2/2017 Haldenby ........... H04L 63/0876
(Continued)

FOREIGN PATENT DOCUMENTS

KR  10-2008-0094776 A  10/2008
KR  10-2009-0005668 A   1/2009
(Continued)

OTHER PUBLICATIONS

Jeong, KR 10-2008-0094776, Translation by Google, Reference located in Applicant's IDs dated Nov. 16, 2020. (Year: 2008).*

*Primary Examiner* — Taelor Kim
(74) *Attorney, Agent, or Firm* — Bridgeway IP Law Group, PLLC; Sang Ho Lee; Hyun Woo Shin (57) ABSTRACT

A digital content delivery tracking method performed by a central server includes generating a transfer chain for first digital content in a database of the central server, wherein the generating is performed by a transfer chain manager; authenticating a first user, wherein the authenticating is performed by a user authenticator; and generating a first ownership transfer node in the transfer chain, generating a first ownership indicator indicating the first digital content, recording the first ownership indicator in the first ownership transfer node, and recording an identifier of the first user in the first ownership transfer node, which are performed by the transfer chain manager.

20 Claims, 5 Drawing Sheets

(56) References Cited

U.S. PATENT DOCUMENTS

2019/0132350 A1* 5/2019 Smith .................... G06F 21/577
2019/0238525 A1* 8/2019 Padmanabhan ......... H04L 63/08

FOREIGN PATENT DOCUMENTS

| KR | 10-2012-0042522 A | 5/2012 |
| KR | 10-2012-0118605 A | 10/2012 |
| KR | 10-2013-0072113 A | 7/2013 |
| KR | 10-2015-0080957 A | 7/2015 |
| KR | 10-1686183 B1 | 12/2016 |
| KR | 10-2017-0035574 A | 3/2017 |

* cited by examiner

METHOD AND APPARATUS FOR TRACKING DIGITAL CONTENT TRANSFER

TECHNICAL FIELD

The present disclosure relates to a digital content delivery tracking method and a digital content delivery tracking device.

BACKGROUND ART

With the development in information communication technology, the number of users who use a digital content service is increasing. Furthermore, as various types of digital content services emerge, users are able to use a digital content service through several access media or access paths. Accordingly, providers that provide digital content seek to more efficiently provide digital content by tracking a process in which their digital content is distributed and delivered to users.

DESCRIPTION OF EMBODIMENTS

Technical Problem

Provided is a method and device for tracking delivery of digital content by using a transfer chain.

Technical Solution to Problem

According to an aspect of the present disclosure, a digital content delivery tracking method performed by a central server includes generating a transfer chain for first digital content in a database of the central server, wherein the generating is performed by a transfer chain manager; authenticating a first user, wherein the authenticating is performed by a user authenticator; and generating a first ownership transfer node in the transfer chain, generating a first ownership indicator indicating the first digital content, recording the first ownership indicator in the first ownership transfer node, and recording an identifier of the first user in the first ownership transfer node, which are performed by the transfer chain manager.

According to an embodiment, the digital content delivery tracking method further includes receiving by the transfer chain manager, from a second user, an ownership request based on the first ownership indicator; authenticating the second user, wherein the authenticating is performed by the user authenticator; and generating a second ownership transfer node below the first ownership transfer node corresponding to the first ownership indicator of the transfer chain according to the ownership request, generating a second ownership indicator indicating the first digital content, recording the generated second ownership indicator in the second ownership transfer node, and recording an identifier of the second user in the second ownership transfer node, which are performed by the transfer chain manager.

According to an embodiment, the recording of the identifier of the second user in the second ownership transfer node may be performed only when there are no lower nodes of the first ownership transfer node corresponding to the first ownership indicator or only when a dedicated ownership for the first digital content has been released.

According to an embodiment, the digital content delivery tracking method may further include receiving by the transfer chain manager, from the first user, a delivery request based on the first ownership indicator; and generating a second ownership transfer node below the first ownership transfer node corresponding to the first ownership indicator of the transfer chain according to the received delivery request, generating a second ownership indicator indicating the first digital content, and recording the generated second ownership indicator in the second ownership transfer node, which are performed by the transfer chain manager.

According to an embodiment, the digital content delivery tracking method may further include receiving by the transfer chain manager, from the second user, an ownership request based on the second ownership indicator; authenticating the second user, wherein the authenticating is performed by the user authenticator; and recording an identifier of the second user in the second ownership transfer node corresponding to the second ownership indicator of the transfer chain according to the ownership request, wherein the recording is performed by the transfer chain manager.

According to an embodiment, the digital content delivery tracking method may further include receiving by the transfer chain manager, from the first user, a delivery request based on the first ownership indicator; and generating a first delivery transfer node below the first ownership transfer node corresponding to the first ownership indicator of the transfer chain according to the delivery request, generating a first delivery indicator indicating the first digital content, and recording the generated first delivery indicator in the first delivery transfer node, which are performed by the transfer chain manager.

According to an embodiment, the generating of the first delivery indicator and the recording of the first delivery indicator in the first delivery transfer node may be performed only when there are no lower nodes of the first ownership transfer node corresponding to the first ownership indicator.

According to an embodiment, the digital content delivery tracking method may further include receiving by the transfer chain manager, from the second user, an ownership request based on the first delivery indicator; authenticating the second user, wherein the authenticating is performed by the user authenticator; and generating a second ownership transfer node below the first delivery transfer node corresponding to the first delivery indicator of the transfer chain according to the ownership request, generating a second ownership indicator indicating the first digital content, recording the generated second ownership indicator in the second ownership transfer node, and recording an identifier of the second user in the second ownership transfer node, which are performed by the transfer chain manager.

According to an embodiment, the recording of the identifier of the second user in the second ownership transfer node may be performed only when there are no lower nodes of the first delivery transfer node corresponding to the first delivery indicator.

According to an embodiment, the digital content delivery tracking method may further include receiving by the transfer chain manager, from the first user, a second delivery request based on the first ownership indicator after generating the first delivery transfer node; and generating a second delivery transfer node below the first ownership transfer node corresponding to the first ownership indicator of the transfer chain according to the second delivery request, generating a second delivery indicator indicating the first digital content, and recording the generated second delivery indicator in the second delivery transfer node, which are performed by the transfer chain manager.

According to an embodiment, the digital content delivery tracking method may further include receiving by the transfer chain manager, from a third user, a second ownership request based on the second delivery indicator; authenticating the third user, wherein the authenticating is performed by the user authenticator; and generating a third ownership transfer node below the second delivery transfer node corresponding to the second delivery indicator of the transfer chain according to the second ownership request, generating a third ownership indicator indicating the first digital content, recording the generated third ownership indicator in the third ownership transfer node, and recording an identifier of the third user in the third ownership transfer node, which are performed by the transfer chain manager.

According to an embodiment, media information may be recorded in the first delivery transfer node.

According to an embodiment, media information may be recorded in the second ownership transfer node.

According to an embodiment, the recording of the identifier of the second user in the second ownership transfer node may include performing an additional authentication procedure with respect to the second user.

According to an embodiment, the performing of the additional authentication procedure with respect to the second user may include receiving a password set by the first user from the second user; contacting the first user to receive an approval for the second user; or authenticating the second user by using an identifier of the second user previously received from the first user.

According to an embodiment, the digital content delivery tracking method may further include receiving by the transfer chain manage, from a user, a user interface (UI) providing request based on an ownership indicator or a delivery indicator; and providing the user with a UI allowing selection of an action function for digital content indicated by the ownership indicator or delivery indicator that is the basis of the UI providing request, wherein the providing is performed by the transfer chain manager.

According to an embodiment, the action function for the digital content may include a content delivery function and a content providing function for the digital content.

According to an embodiment, the digital content delivery tracking method may include receiving by the transfer chain manage, from the user, an input of selecting the action function for the digital content; authenticating the user, wherein the authenticating is performed by the user authenticator; and performing the selected action function with respect to the authenticated user, wherein the selected action function is performed by the transfer chain manager.

According to an embodiment, the digital content delivery tracking method may further include receiving by the transfer chain manage, from the user, a content providing request based on an ownership indicator or a delivery indicator; authenticating the user, wherein the authenticating is performed by the user authenticator; and providing the authenticated user with digital content indicated by the ownership indicator or delivery indicator (hereinafter, referred to as a 'base indicator') that is the basis of the content providing request, wherein the providing is performed by the transfer chain manager.

According to an embodiment, the digital content delivery tracking method may further include recording a result of providing the digital content indicated by the base indicator, together with an identifier of the authenticated user, in a transfer chain corresponding to the base indicator, wherein the recording is performed by the transfer chain manager.

According to an embodiment, the digital content delivery tracking method may further include recording media information about the content providing request, in a transfer chain corresponding to the base indicator, wherein the recording is performed by the transfer chain manager.

According to an embodiment, the digital content delivery tracking method may further include determining whether the digital content indicated by the base indicator is capable of being provided to the authenticated user, wherein the determining is performed by the transfer chain manager, and the determining of whether the digital content indicated by the base indicator is capable of being provided may include determining whether there is a lower node of a transfer node corresponding to the base indicator; determining whether the authenticated user is a user of which an identifier has been recorded in the transfer node corresponding to the base indicator; or checking a content access attribute of the transfer node corresponding to the base indicator.

According to an embodiment, the providing of the digital content indicated by the base indicator to the authenticated user may include performing an additional authentication procedure with respect to the authenticated user.

According to an embodiment, the providing of the digital content indicated by the base indicator to the authenticated user may include transmitting a providing request for the digital content indicated by the base indicator, together with an identifier of the authenticated user, to a digital content providing server.

According to an embodiment, the first digital content may have a quantity attribute, and the digital content delivery tracking method may further include recording the quantity attribute of the first digital content in the first ownership transfer node, wherein the recording is performed by the transfer chain manager; receiving by the transfer chain manage, from the user, a division request based on the first ownership indicator; and dividing the first digital content into second digital content and third digital content that have quantity attributes according to the division request. The dividing of the first digital content into the second digital content and the third digital contents having quantity attributes may include generating a fourth ownership indicator indicating the second digital content, generating a fourth ownership transfer node below the first ownership transfer node corresponding to the first ownership indicator of the transfer chain, and recording the identifier of the first user, the quantity attribute of the second digital content, and the fourth ownership indicator in the fourth ownership transfer node; and generating a fifth ownership indicator indicating the third digital content, generating a fifth ownership transfer node below the first ownership transfer node corresponding to the first ownership indicator of the transfer chain, and recording the identifier of the first user, the quantity attribute of the third digital content, and the fifth ownership indicator in the fifth ownership transfer node.

According to an embodiment, the dividing of the first digital content into the second digital content and the third digital content having quantity attributes may be performed only when there are no lower nodes of the first ownership transfer node corresponding to the first ownership indicator.

According to an embodiment, combination of digital content having quantity attributes may be prohibited.

According to an aspect of the present disclosure, a central server for tracking delivery of digital content includes a user authenticator configured to authenticate a first user; and a transfer chain manager configured to generate a transfer chain for first digital content in a database of the central server, generate a first ownership transfer node in the transfer chain, generate a first ownership indicator indicating the first digital content, record the first ownership indicator in the first ownership transfer node, and record an identifier of the first user in the first ownership transfer node.

According to an aspect of the present disclosure, a computer program is stored in a recording medium to execute the digital content delivery tracking method in a computer.

Advantageous Effects of Disclosure

According to the present disclosure, a delivery path and a propagation process of digital content can be tracked and analyzed by configuring information about a process of delivering and providing the digital content by using a transfer chain.

BEST MODE

Hereinafter, preferred embodiments of the present disclosure will be described in detail with reference to the accompanying drawings in order to clarify the technical idea of the present disclosure. While describing the disclosure, detailed description of related well-known functions or configurations may be omitted when it is deemed that they may unnecessarily obscure the essence of the disclosure. Components having substantially the same functional configuration among the drawings are assigned the same reference numerals and reference characters as possible even though they are indicated on different drawings. If necessary for convenience of explanation, a device and a method will be described together.

Figure 1:
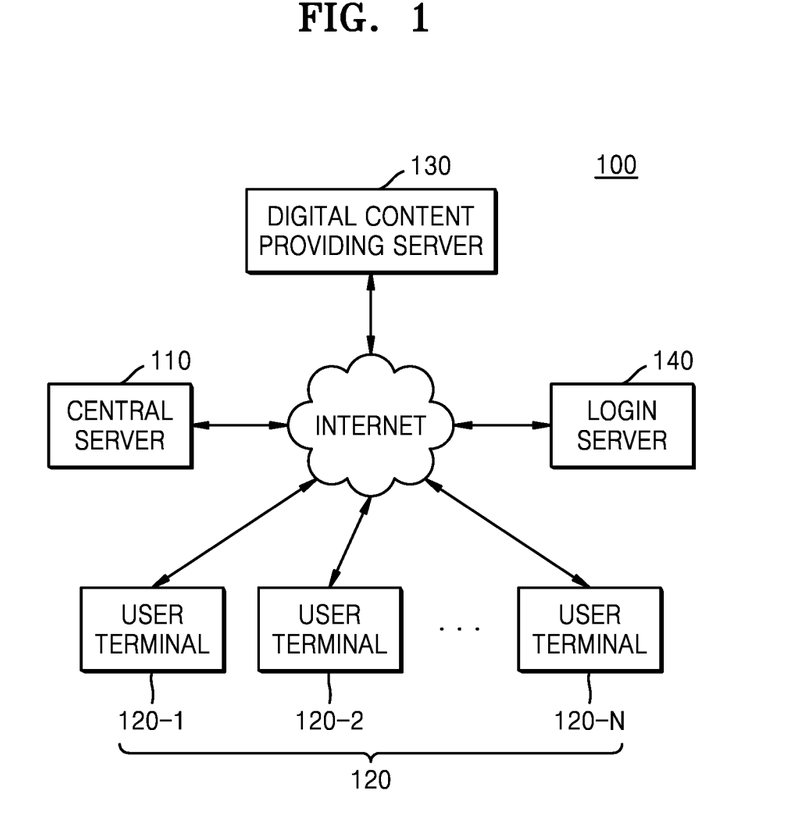
FIG. 1 is a schematic block diagram of a digital content delivery tracking system according to an embodiment of the present disclosure.

FIG. 1 is a schematic block diagram of a digital content delivery tracking system 100 according to an embodiment of the present disclosure.

Referring to FIG. 1, the digital content delivery tracking system 100 includes a central server 110 and user terminals 120. The user terminals 120 may include a computer, a smartphone, and the like, may be a plurality of user terminals 120-1, 120-1, . . . , and 120-N, and may be specified by users who use the user terminals 120. In this specification, a user terminal and a user who uses the user terminal are not specifically differentiated and described. The digital content delivery tracking system 100 may further include a digital content providing server 130 and/or a login server 140.

The central server 110 manages information about a process in which digital content is delivered between users and is provided to a user. The digital content being delivered between users may refer to ownership or use of the digital content being delivered.

The digital content may be directly provided by the central server 110, or may be provided by the digital content providing server 130. According to an embodiment, when the types of services that provide digital content are different and the subjects that provide digital content are different, a plurality of digital content providing servers may be included. The digital content may include a variety of digital content such as digital media, e-books, game items, digital subscriptions, discount vouchers, electronic coupons, gift codes, delivery vouchers, product purchase web pages, and cryptocurrencies.

The login server 140 performs a login service. The login service is a service that provides a login function to another service (i.e., another server) by using one's user account information. A representative example is a social login service provided by a social network service such as Facebook or Twitter, but the present disclosure is not limited to the social login services.

Figure 2:
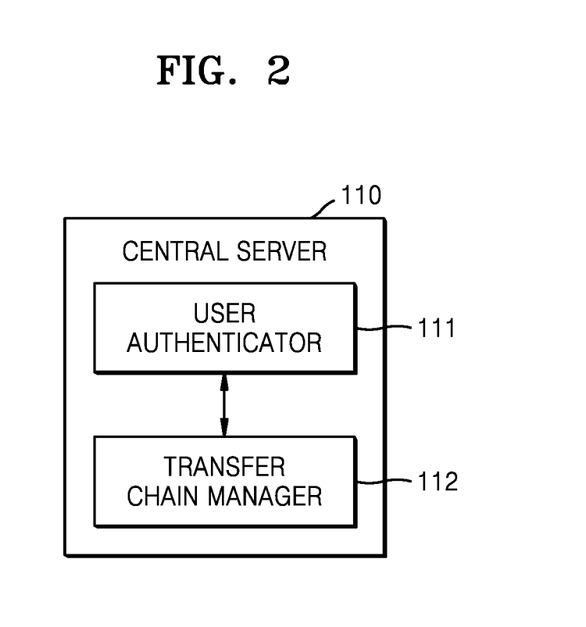
FIG. 2 is a block diagram of a structure of a central server according to an embodiment of the present disclosure.

FIG. 2 is a block diagram of a structure of the central server 110 according to an embodiment of the present disclosure. Referring to FIG. 2, the central server 110 includes a user authenticator 111 and a transfer chain manager 112. The central server 110 may include a database (not shown).

Figure 3:
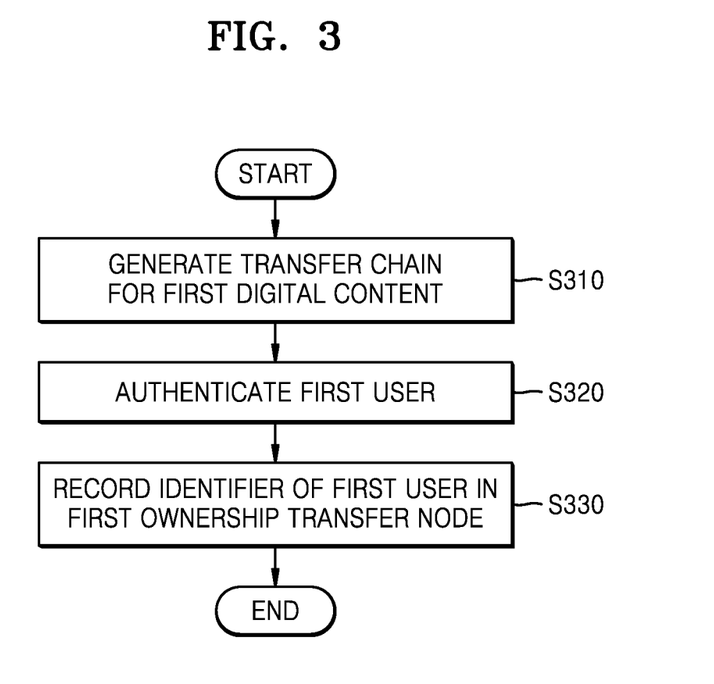
FIG. 3 is a flowchart of a digital content delivery tracking method that is performed by the central server, according to an embodiment of the present disclosure.

FIG. 3 is a flowchart of a digital content delivery tracking method that is performed by the central server 110, according to an embodiment of the present disclosure.

Referring to FIG. 3, the transfer chain manager 112 may generate a transfer chain for a first digital content in the database of the central server 110 (S310).

The user authenticator 111 may authenticate a first user (S320). During the user authentication process, the first user may log in directly to the central server 110 or may log in to the central server 110 via the login server 140. In this specification, each operation is not necessarily performed in order unless otherwise specified. For example, operation S320 may be performed earlier than operation S310, and may be performed while operation S330 is being performed.

The transfer chain manager generates a first ownership transfer node in the transfer chain, generates a first ownership indicator indicating the first digital content and records the same in the first ownership transfer node, and records an identifier of the first user obtained through authentication of the first user in the first ownership transfer node (S330). The first ownership indicator indicates ownership of first digital content, and thus may include an online/offline result such as a URL, a QR code, and an encrypted code. According to an embodiment, the first ownership indicator may be generated by combining a user identifier, browser fingerprint, media information, issuing machine information, issuing time, and the like. These pieces of information may be included in the first ownership indicator and may be recorded in the first ownership transfer node or recorded separately. The media information will be described later again. With regard to the first ownership indicator, the invention disclosed in Korean Patent No. 1686183 of the present applicant may be used.

The first ownership indicator and the identifier of the first user being recorded in the first transfer node represents that the first user is the owner of the first digital content. Owning content through an ownership indicator does not necessarily mean exclusive ownership, but means that you have specific rights, such as being able to access the content or to acquire (for example, purchase) the content. There may be a plurality of owners or only one owner of one piece of content. When the number of owners of one content is limited to one, the owner of the content is referred to as a dedicated owner.

The first user may be the first owner of the first digital content, or may be a person who has received ownership from another owner. Delivery of ownership between users will be described later in detail through first to third embodiments by taking, as an example, a case of delivering ownership from the first user to a second user.

The recording of the first ownership indicator and the recording of the identifier of the first user may be performed together, or may be performed at different time points. For example, the transfer chain manager may generate the first ownership indicator while the first user is being logged in and record the generated first ownership indicator together with the identifier of the first user in the transfer chain, or may generate the first ownership indicator and record the generated first ownership indicator in the transfer chain and then provide the generated first ownership indicator to the first user or a third party and may record the identifier of the first user in the transfer chain only when the first user requests registration of ownership in response to the first ownership indicator. The transfer chain manager may generate and provide a special indicator for delivering ownership of content, and, when the first user requests ownership registration in response to the special indicator, the transfer chain manager may generate the first ownership indicator and may record the generated first ownership indicator together with the identifier of the first user in the transfer chain. The indicator for this ownership delivery is referred to as a delivery indicator, and will be described in more detail later through the third embodiment.

The central server 110 may provide the first ownership indicator to the first user. According to an embodiment, the central server 110 may directly provide the first ownership indicator to the first user, or may deliver the first ownership indicator to the first user through a third party, for example, the digital content providing server 130 or another user.

A process of delivering ownership from the first user to the second user will now be described.

First Embodiment

Figure 4:
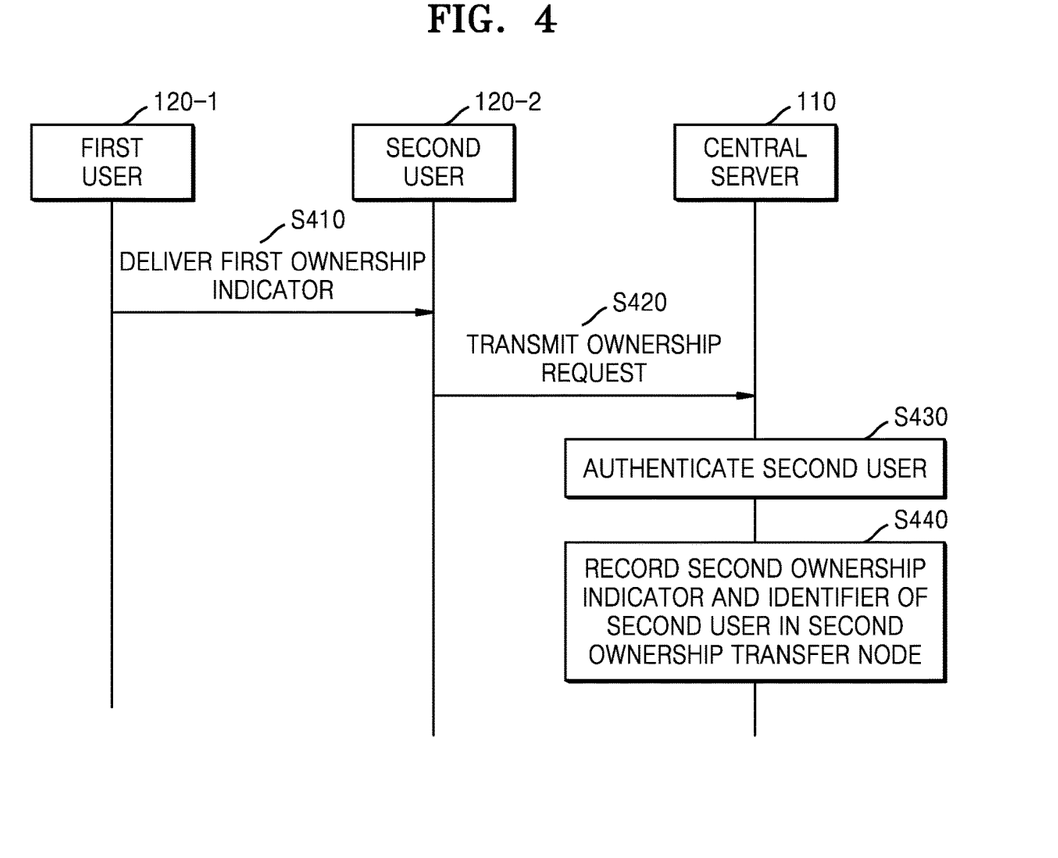
FIG. 4 is a sequence diagram of a first embodiment of the digital content delivery tracking method according to an embodiment of the present disclosure.

FIG. 4 is a sequence diagram of a first embodiment of the digital content delivery tracking method according to an embodiment of the present disclosure.

Referring to FIG. 4, a second user 120-2 may receive the first ownership indicator (S410). According to an embodiment, the second user 120-2 may receive the first ownership indicator from a first user 120-1, directly receive the first ownership indicator from the central server 110, or may receive the first ownership indicator through another device. The first user or the central server 100 may use various methods such as a messenger, an SNS, an email, a text message, a bulletin board, QR code scan, a smart speaker, short-range communication, optical communication, and sound wave communication, in order to deliver the first ownership indicator to the second user.

According to an embodiment, the first user may obtain a UI related to content delivery and the like from the central server 110 by using the first ownership indicator. For example, the first user may be connected to a webpage, a chatbot, a voice interface (for example, an interface through a smart speaker), or the like by clicking a URL that is the first ownership indicator or by scanning a QR code that is the first ownership indicator. The UI obtained from the central server 110 may include an ownership registration function, a content delivery function, a content providing function, and the like. The first user may record his or her own identifier in the first ownership transfer node by selecting the ownership registration function, may deliver the first ownership indicator to the second user by selecting the content delivery function, or may receive the first digital content by selecting the content providing function. When the first user selects the content delivery function, a UI for selecting a content delivery method (the above-described method of delivering the first ownership indicator) may be provided. The content delivery method may be the above-described messenger, SNS, email, or the like, and, in more detail, may include specific services such as Facebook, Twitter, KakaoTalk, Line, and Band.

The second user 120-2 may transmit an ownership request based on the first ownership indicator to the central server 110, and the transfer chain manager 112 of the central server 110 may receive the ownership request (S420). According to an embodiment, transmitting the ownership request based on the first ownership indicator to the central server 110 may be simply executing the first ownership indicator, for example, clicking the URL, which is the first ownership indicator, or scanning the QR code, which is the first ownership indicator. According to another embodiment, transmitting the ownership request based on the first ownership indicator to the central server 110 may be selecting the ownership registration function from a UI obtained using the first ownership indicator, for example, a webpage connected by clicking the URL which is the first ownership indicator.

The user authenticator 111 authenticates the second user (S430). As described above, user authentication may be performed when a user logs in to the central server 110 or the login server 140, or may be performed regardless of the order with other operations. If a user has not been logged in when the transfer chain manager receives the ownership request, the user authenticator may perform the user authentication.

The transfer chain manager may generate a second ownership transfer node below the first ownership transfer node corresponding to the first ownership indicator of the transfer chain according to the ownership request of the second user, generate a second ownership indicator indicating the first digital content, record the generated second ownership indicator in the second ownership transfer node, and may record the identifier of the second user in the second ownership transfer node (S440). The second ownership indicator is distinguished from the first ownership indicator. Ownership indicators may be simply different unique values, or may be distinguished from each other by being generated by including information such as a user identifier, browser fingerprint, media information, issuing machine information, and issuing time. These pieces of information may be included in the second ownership indicator and may be recorded in the second ownership transfer node or recorded separately. The central server 110 may directly or indirectly provide the second ownership indicator to the second user. As such, according to the present disclosure, a user's identifier is recorded in a transfer chain by performing authentication with respect to each user who has received a content, a special transfer node is generated for each user, and a unique ownership indicator is assigned for each user, so that a delivering and using process of the content may be accurately tracked.

As described above, the transfer chain manager may record media information in the transfer chain. The media information is related to media (for example, Facebook) through which a content is delivered. According to an embodiment, the transfer chain manager may obtain the media information by allowing the first user to select a delivering method of the first ownership indicator from the UI obtained using the first ownership indicator. Of course, the transfer chain manager may acquire media information by using other methods such as an HTTP referrer. Through such media information recording, it is possible to analyze a media propagation map or the like through which content is transmitted. For example, when user A shares content through KakaoTalk, and acquaintances who obtained the content upload a lot of content sharing on Facebook, and a lot of Return On Investment (ROI) actions (e.g., purchase) occur in a URL shared on Facebook, it becomes possible to determine that user A's network for the product is valid not on KakaoTalk but on Facebook.

The transfer chain manager may separately record information of a medium used by the first user to deliver content and information of a medium used by the second user to register ownership of the content, in the transfer chain. When the first delivery indicator shared by the first user through medium A has wandered and reached the second user through medium B, a medium used by the first user to share content and a medium used by the second user to register ownership of the content may be separately recorded, and thus a medium propagation process may be more accurately tracked.

According to an embodiment, the transfer chain manager may perform a process according to an ownership request based on the first ownership indicator, only when there are no lower nodes of the first ownership transfer node corresponding to the first ownership indicator. Accordingly, when another person has registered ownership based on an ownership indicator, use of the ownership indicator may be made impossible, or, when the ownership indicator is changed to a delivery indicator as will be described later, use of the ownership indicator may be made impossible. This may be useful particularly when an owner is a dedicated owner, and a problem of double usage may be addressed.

The transfer chain manager may perform a process according to an ownership request based on delivery attributes recorded in the first ownership transfer node corresponding to the first ownership indicator. The delivery attributes may include pieces of information such as whether a new user is able to register ownership and the number of users capable of registering ownership. According to an embodiment, the transfer attributes may be set and fixed when the transfer chain is created, or an owner may change the transfer attributes of a corresponding node. When the ownership request is processed only when the owner has set the delivery attributes so that a new user can register the ownership, content is delivered only by the owner's explicit delivery action, thus preventing stealing of the content due to unauthorized copying by a third party. When a dedicated ownership attribute is set in the transfer chain of the first digital content, the transfer chain manager may perform a process according to an ownership request only when a dedicated ownership of the first digital content has been released.

According to an embodiment, the transfer chain manager may perform an additional authentication procedure with respect to the second user upon an ownership request of the second user. This additional authentication procedure may be performed when additional authentication information has been set in the first ownership transfer node. According to an embodiment, the transfer chain manager may receive a password set by the first user from the second user and may perform additional authentication. The password information set by the first user may be recorded in a corresponding transfer node. According to another embodiment, the transfer chain manager may inform the first user that the second user tries to register ownership, and may receive an approval for the second user from the first user. At this time, the transfer chain manager may contact the first user through various methods such as an ARS, a text message, and chatbot notification. According to another embodiment, the first user may previously designate the second user who is to deliver content. In other words, the transfer chain manager may authenticate the second user by using identifiers of the second user previously received from the first user, for example, an SNS ID and a telephone number.

The transfer chain manager may generate a new ownership transfer node and a new ownership indicator whenever receiving an ownership request based on the first ownership indicator. For example, when the transfer chain manager generates the second ownership transfer node by receiving the ownership request based on the first ownership indicator from the second user and then receives a second ownership request based on the first ownership indicator from a third user, the user authenticator may authenticate the third user, and the transfer chain manager may additionally generate a third ownership transfer node below the first ownership transfer node corresponding to the first ownership indicator of the transfer chain according to the received second ownership request, generate a third ownership indicator indicating the first digital content, record the generated third ownership indicator in the third ownership transfer node, and may record an identifier of the third user in the third ownership transfer node. The third ownership indicator is distinguished from the first ownership indicator and the second ownership indicator.

Second Embodiment

Figure 5:
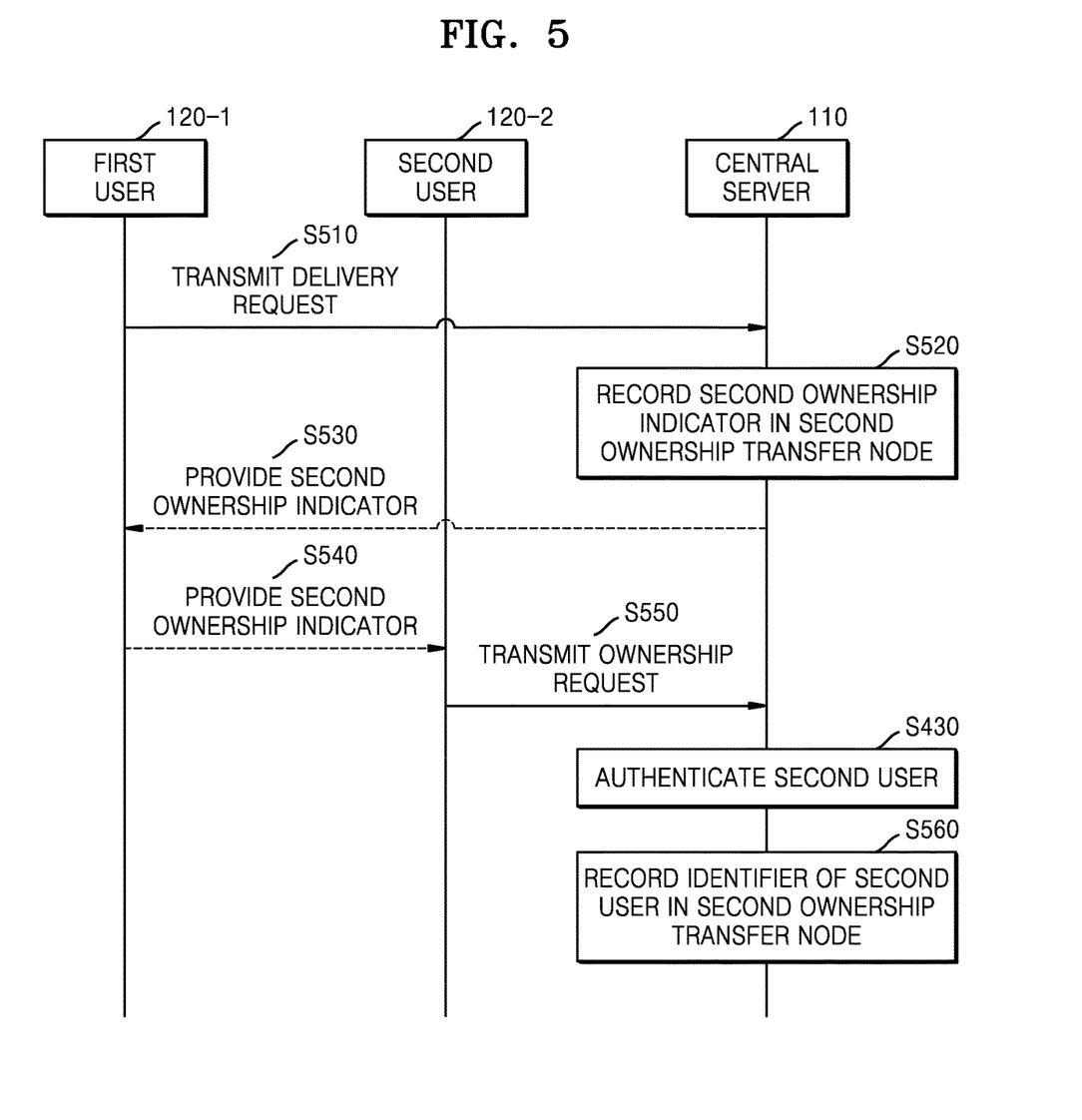
FIG. 5 is a sequence diagram of a second embodiment of the digital content delivery tracking method according to an embodiment of the present disclosure.

FIG. 5 is a sequence diagram of a second embodiment of the digital content delivery tracking method according to an embodiment of the present disclosure. The second embodiment will now be described by focusing on differences from the first embodiment.

Referring to FIG. 5, the first user 120-1 may transmit a delivery request based on the first ownership indicator to the central server 110, and the transfer chain manager of the central server 110 may receive the delivery request (S510). According to an embodiment, the first user may transmit the delivery request based on the first ownership indicator to the central server 110 by selecting the content delivery function from the UI obtained using the first ownership indicator. When the first user selects the content delivery function, a UI for selecting a content delivery method (a later-described method of delivering the second ownership indicator) may be provided. The first user may transmit the delivery request based on the first ownership indicator to the central server 110 by simply executing the first ownership indicator. For example, when the first user clicks the URL that is the first ownership indicator, a content delivery message may be automatically sent to friends of the first user according to an authority previously agreed by an API call of the central server.

The transfer chain manager may generate the second ownership transfer node below the first ownership transfer node corresponding to the first ownership indicator of the transfer chain according to the received delivery request, generate the second ownership indicator indicating the first digital content, and record the generated second ownership indicator in the second ownership transfer node (S520). Issuing time information, media information, and the like may be included in the second ownership indicator and may be recorded in the second ownership transfer node or recorded separately.

The transfer chain manager may perform a process according to the delivery request based on the first ownership indicator, only when there are no lower nodes of the first ownership transfer node corresponding to the first ownership indicator. The transfer chain manager may perform a process according to the delivery request, based on the delivery attributes recorded in the first ownership transfer node corresponding to the first ownership indicator.

The central server 110 may directly or indirectly provide the generated second ownership indicator to the second user 120-2. For example, the central server 110 may provide the second ownership indicator to the first user (S530), and the first user may deliver the second ownership indicator to the second user through various methods (S540). As described above, the first user may select a content delivery method from the UI obtained using the first ownership indicator, and the central server 110 may directly deliver the second ownership indicator to the second user or deliver the second ownership indicator to the second user via the first user according to the selected method. According to another embodiment, the first user may select the content delivery method from a UI obtained using the second ownership indicator.

The second user 120-2 may transmit an ownership request based on the second ownership indicator to the central server 110 in response to the second ownership indicator, and the transfer chain manager 112 of the central server 110 may receive the ownership request (S550). Transmitting the ownership request based on the second ownership indicator to the central server 110 may be simply executing the second ownership indicator or selecting the ownership registration function from the UI obtained using the second ownership indicator.

The user authenticator 111 authenticates the second user (S430).

The transfer chain manager may record the identifier of the second user to the second ownership transfer node corresponding to the second ownership indicator of the transfer chain according to the received ownership request (S560).

When a new user is able to register the ownership through a delivery request of an owner as described above, content is delivered only by the owner's explicit delivery action, thus preventing stealing of the content due to unauthorized copying by a third party.

The transfer chain manager may record time information, media information, and the like about ownership registration in the second ownership transfer node. The transfer chain manager may perform a process according to an ownership request based on the second ownership indicator, only when there are no lower nodes of the second ownership transfer node corresponding to the second ownership indicator. The transfer chain manager may perform an additional authentication procedure with respect to the second user upon an ownership request of the second user.

The transfer chain manager may generate a new ownership transfer node and a new ownership indicator whenever receiving a delivery request based on the first ownership indicator. For example, when the transfer chain manager generates the second ownership transfer node by receiving the delivery request based on the first ownership indicator from the first user and then receives a second ownership request based on the first ownership indicator from the first user, the transfer chain manager may additionally generate a third ownership transfer node below the first ownership transfer node corresponding to the first ownership indicator of the transfer chain according to the received second delivery request, generate a third ownership indicator indicating the first digital content, and record the generated third ownership indicator in the third ownership transfer node. The third ownership indicator is distinguished from the first ownership indicator and the second ownership indicator. The central server 110 may directly or indirectly provide the generated third ownership indicator to the third user.

When the transfer chain manager receives a second ownership request based on the third ownership indicator from the third user, the user authenticator may authenticate the third user, and the transfer chain manager may record the identifier of the third user in the third ownership transfer node corresponding to the third ownership indicator of the transfer chain according to the received second ownership request.

Third Embodiment

Figure 6:
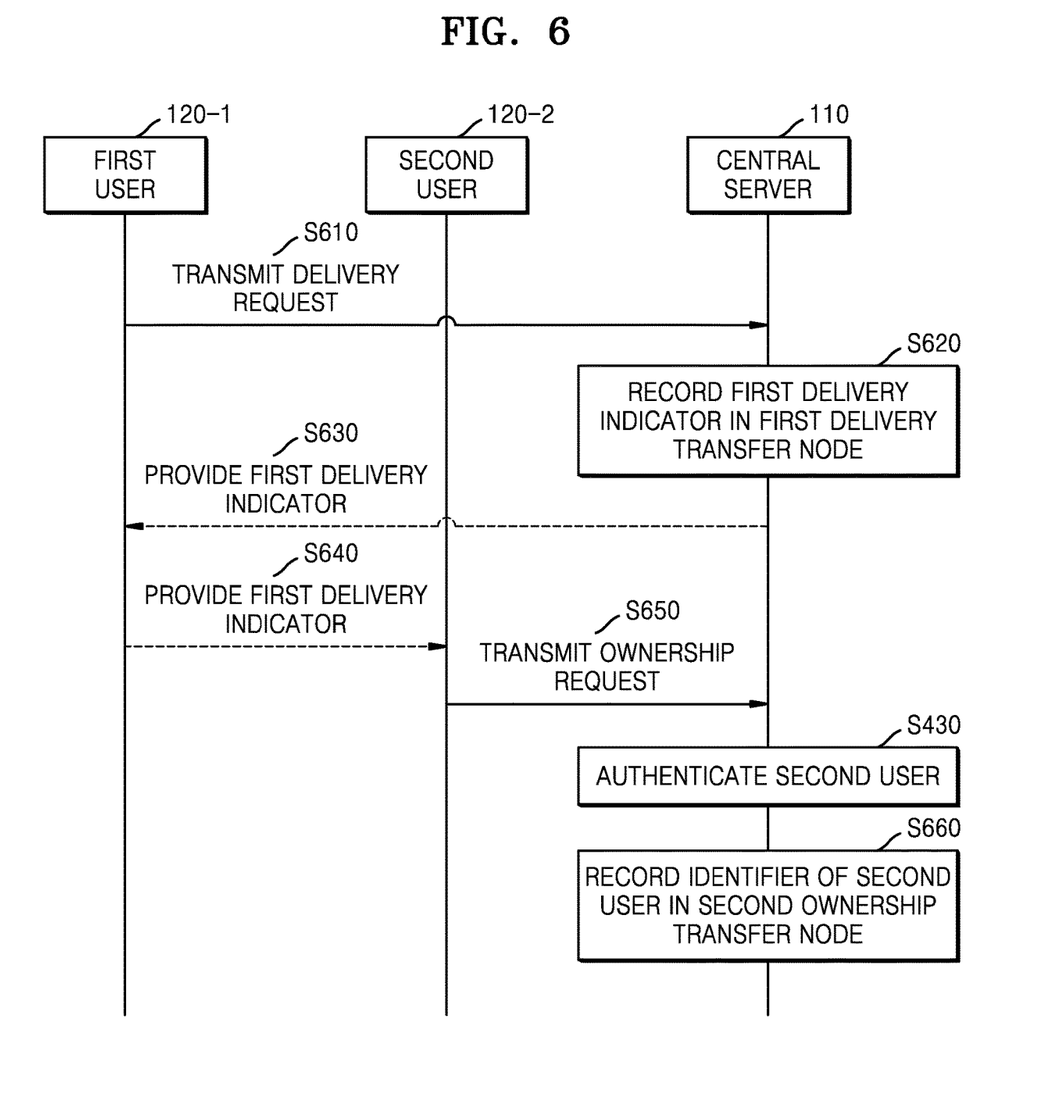
FIG. 6 is a sequence diagram of a third embodiment of the digital content delivery tracking method according to an embodiment of the present disclosure.

FIG. 6 is a sequence diagram of a third embodiment of the digital content delivery tracking method according to an embodiment of the present disclosure. The third embodiment will now be described by focusing on differences from the first and second embodiments.

Referring to FIG. 6, the first user 120-1 may transmit the delivery request based on the first ownership indicator to the central server 110, and the transfer chain manager of the central server 110 may receive the delivery request (S610). According to an embodiment, the first user may transmit the delivery request based on the first ownership indicator to the central server 110 by selecting the content delivery function from the UI obtained using the first ownership indicator. When the first user selects the content delivery function, a UI for selecting a content delivery method (a below-described method of delivering a first delivery indicator) may be provided. The first user may transmit the delivery request based on the first ownership indicator to the central server 110 by simply executing the first ownership indicator.

The transfer chain manager may generate a first delivery transfer node below the first ownership transfer node corresponding to the first ownership indicator of the transfer chain according to the received delivery request, generate a first delivery indicator indicating the first digital content, and record the generated first delivery indicator in the first delivery transfer node (S620). A delivery indicator may include a QR code, a URL, an encrypted code, etc. like the ownership indicator, and the invention disclosed in Korean Patent No. 1686183 of the present applicant may be used in relation to the delivery indicator. The delivery indicator may also be a simple unique value, or may be generated by combining a user identifier, browser fingerprint, media information, issuing machine information, issuing time, and the like. Thus, according to the present disclosure, whenever a new delivery indicator or ownership indicator is generated, each of the new delivery indicator and the new ownership indicator may be generated as a new value. In other words, the first delivery indicator is distinguished from the first ownership indicator and the second ownership indicator. Issuing time information, media information, and the like may be included in the first delivery indicator and may be recorded in the first delivery transfer node or recorded separately. According to an embodiment, the transfer chain manager may obtain the media information by allowing the first user to select a delivering method of the first delivery indicator from the UI obtained using the first ownership indicator.

According to an embodiment, the transfer chain manager may record the identifier of the first user in the first delivery transfer node. The transfer chain manager may perform a process according to a delivery request based on the first ownership indicator, only when there are no lower nodes of the first ownership transfer node corresponding to the first ownership indicator. The transfer chain manager may perform a process according to a delivery request based on delivery attributes recorded in the first ownership transfer node corresponding to the first ownership indicator.

The central server 110 may directly or indirectly provide the generated first delivery indicator to the second user 120-2. For example, the central server 110 may provide the first delivery indicator to the first user (S630), and the first user may deliver the first delivery indicator to the second user through various methods (S640). As described above, the first user may select the content delivery method from the UI obtained using the first ownership indicator. According to another embodiment, the first user may select the content delivery method from a UI obtained using the first delivery indicator.

The second user 120-2 may transmit an ownership request based on the first delivery indicator to the central server 110 in response to the first delivery indicator, and the transfer chain manager 112 of the central server 110 may receive the ownership request (S650). Transmitting the ownership request based on the first delivery indicator to the central server 110 may be simply executing the first delivery indicator or selecting the ownership registration function from the UI obtained using the first delivery indicator.

The user authenticator 111 authenticates the second user (S430).

The transfer chain manager may generate a second ownership transfer node below the first delivery transfer node corresponding to the first delivery indicator of the transfer chain according to the received ownership request, generate a second ownership indicator indicating the first digital content, record the generated second ownership indicator in the second ownership transfer node, and may record the identifier of the second user in the second ownership transfer node (S660). Issuing time information, media information, and the like may be included in the second ownership indicator and may be recorded in the second ownership transfer node or recorded separately. As described above, the transfer chain manager may obtain information of media used by the second user, by using an HTTP referrer or the like.

When a new user is able to register the ownership through a delivery request of an owner as described above, content is delivered only by the owner's explicit delivery action, thus preventing stealing of the content due to unauthorized copying by a third party.

When an ownership indicator is separated from a delivery indicator as described above, functions of the two indicators may be made different, such as enabling only a corresponding owner to use the ownership indicator and enabling everybody to use the delivery indicator.

Because a delivery indicator delivered to a new owner and an ownership indicator obtained when a corresponding owner has registered ownership are different from each other, a third party other than the owner may be prevented from obtaining the ownership indicator. In particular, when an indicator generated according to a delivery request of the original owner is delivered to the original owner and then delivered to a new owner, the original owner ascertains the ownership indicator of the new owner in the second embodiment. However, according to the present embodiment, the original owner cannot ascertain the ownership indicator of the new owner.

As described above, the transfer chain manager may record media information in the first delivery transfer node and/or the second ownership transfer node. When media information is recorded in each of the first delivery transfer node and the second ownership transfer node, the medium used by the first user to share content and the medium used by the second user to register ownership of the content may be separately recorded, and thus a medium propagation process may be more accurately tracked. The transfer chain manager may perform a process according to an ownership request, only when there are no lower nodes of the first delivery transfer node corresponding to the first delivery indicator. The transfer chain manager may perform a process according to an ownership request, based on delivery attributes of the first delivery transfer node corresponding to the first delivery indicator. The transfer chain manager may perform an additional authentication procedure with respect to the second user upon an ownership request of the second user.

The transfer chain manager may generate a new delivery transfer node and a new delivery indicator whenever receiving a delivery request based on the first ownership indicator. For example, when the transfer chain manager generates the first delivery transfer node by receiving the delivery request based on the first ownership indicator from the first user and then receives a second delivery request based on the first ownership indicator from the first user, the transfer chain manager may additionally generate a second delivery transfer node below the first ownership transfer node corresponding to the first ownership indicator of the transfer chain according to the received second delivery request, generate a second delivery indicator indicating the first digital content, and record the generated second delivery indicator in the second delivery transfer node. The second delivery indicator is distinguished from the first ownership indicator and the first delivery indicator. The central server 110 may directly or indirectly provide the generated second delivery indicator to the third user.

When the transfer chain manager receives the second ownership request based on the second delivery indicator from the third user, the user authenticator may authenticate the third user, and the transfer chain manager may generate a third ownership transfer node below the second delivery transfer node corresponding to the second delivery indicator of the transfer chain according to the received second ownership request, generate a third ownership indicator indicating the first digital content, record the generated third ownership indicator in the third ownership transfer node, and record an identifier of the third user in the third ownership transfer node. The third ownership indicator is distinguished from another ownership/delivery indicator.

A process in which the central server 110 provides digital content to a user will now be described.

The transfer chain manager may receive a content providing request based on the ownership indicator or the delivery indicator from the user 120. The user denotes an arbitrary user, and may be, for example, the above-described first user, the above-described second user, or the above-described third user. An ownership indicator or delivery indicator that is the basis of a content providing request (hereinafter, a 'base indicator') may denote an arbitrary indicator, and may be, for example, the above-described first ownership indicator, the above-described second ownership indicator, the above-described third ownership indicator, the above-described first delivery indicator, or the above-described second delivery indicator. According to an embodiment, the content providing request may be based on only the ownership indicator. According to an embodiment, the first user may transmit a delivery request based on a base ownership indicator to the central server 110 by selecting the content providing function from a UI obtained using a base indicator.

The user authenticator of the central server 110 authenticates the user. As described above, the user authentication may be performed regardless of the order. The transfer chain manager provides digital content indicated by the base indicator to the authenticated user. Providing the digital content may refer to purchasing the product of the user. The transfer chain manager may record a result of providing the digital content indicated by the base indicator, together with the identifier of the authenticated user, in a transfer chain corresponding to the base indicator. Accordingly, not only a delivery history of the digital content but also a providing history of the digital content may be tracked. For example, when the digital content indicated by the base indicator is a product purchase webpage, product information, purchasing time, a purchasing type, a discount type, and the like of a product purchased by the user through the webpage may be recorded in the transfer chain. The transfer chain manager may store browser fingerprint, media information, providing machine information, providing time, and the like together with the result of providing the digital content.

The transfer chain manager may determine whether the digital content indicated by the base indicator is in a state capable of being provided to the authenticated user. According to an embodiment, the transfer chain manager may determine whether the digital content indicated by the base indicator is able to be provided, by determining whether there is a lower node of a transfer node corresponding to the base indicator. As a result of the determination, the digital content indicated by the base indicator may be provided only when there are no lower nodes. According to another embodiment, the transfer chain manager may determine whether the digital content indicated by the base indicator is able to be provided, by determining whether the authenticated user is a user of which an identifier has been recorded in the transfer node corresponding to the base indicator. According to another embodiment, the transfer chain manager may determine whether the digital content indicated by the base indicator is able to be provided, by checking a content access attribute of the transfer node corresponding to the base indicator. The content access attribute may include information about whether the digital content has been set to be capable of being provided, whether a dedicated right to use has been set, whether it has been set that everybody (even a user who has not been recorded in the transfer node) is able to receive the digital content, whether the digital content has already been provided, and the number of times the digital content can be provided. A content access attribute can be set not only for the ownership indicator but also for the delivery indicator. When it is determined that the digital content is in a state capable of being provided to the authenticated user, the transfer chain manager may provide the digital content indicated by the base indicator to the authenticated user.

The central server 110 may directly provide the digital content to the authenticated user or may provide the digital content to the authenticated user through a third party. For example, the transfer chain manager may transmit a request of providing the digital content indicated by the base indicator, together with the identifier of the authenticated user, to the digital content providing server 130 by a content provider (CP). In this case, a user may be re-directed to the webpage of the CP. When the user finishes an action (e.g., purchase) in the re-directed webpage, the digital content providing server 130 may deliver a result of the action to the central server 110, and the central server 110 may record the result of the action in the transfer chain. In response to the request of providing the digital content, the digital content providing server 130 may provide the digital content indicated by the base indicator to a corresponding user. At this time, the digital content providing server 130 may directly provide the digital content to the user 120, or may provide the digital content to the user 120 via another device such as the central server 110. The central server 110 and the digital content providing server 130 may synchronize a user account by using the invention disclosed in Applicant's Patent No. 2015-0134592, in order to provide the digital content to the authenticated user.

According to an embodiment, the transfer chain manager may perform an additional authentication procedure with respect to the authenticated user in order to provide the digital content. This additional authentication procedure may be performed when additional authentication information has been set in the transfer node corresponding to the base indicator.

As described above, the central server 110 may provide a UI related to content delivery or the like to the user. In other words, when the transfer chain manager receives a UI providing request based on the ownership indicator or the delivery indicator from the user, the transfer chain manager may provide the user with a UI allowing selection of an action function with respect to the digital content indicated by the ownership indicator or delivery indicator that is the basis of the UI providing request. The action function with respect to the digital content may include an ownership registration function, a content delivery function, a content providing function, a content division function, and the like. The UI providing request may be simply executing the ownership indicator or the delivery indicator, for example, clicking a URL that is an indicator or scanning a QR code that is an indicator. When the user selects an action function with respect to the digital content, the transfer chain manager receives an action function selection input from the user, the user authenticator authenticates the user, and the transfer chain manager performs the selected action function with respect to the authenticated user. Of course, the user authentication may be performed regardless of the order.

Division of digital content having a quantity attribute will now be described.

When the first digital content has a quantity attribute, the transfer chain manager records the quantity attribute of the first digital content in the first ownership transfer node.

The transfer chain manager receives a division request based on the first ownership indicator from the first user. The first user transmitting the division request based on the first ownership indicator may be selecting the content division function from the UI obtained using the first ownership indicator. According to an embodiment, the transfer chain manager may perform a process according to the division request, only when there are no lower nodes of the first ownership transfer node corresponding to the first ownership indicator.

The transfer chain manager divides the first digital content having a quantity attribute into a plurality of digital content having quantity attributes according to the division request.

For example, the transfer chain manager may divide a first digital content having a quantity attribute of 50 into a second digital content having a quantity attribute of 20 and a third digital content having a quantity attribute of 30. The transfer chain manager may generate a fourth ownership indicator indicating the second digital content, and may generate a fourth ownership transfer node below the first ownership transfer node corresponding to the first ownership indicator of the transfer chain. The transfer chain manager may record the identifier of the first user, the quantity attribute of the second digital content, and the fourth ownership indicator in the fourth ownership transfer node. The transfer chain manager may generate a fifth ownership indicator indicating the third digital content, and may generate a fifth ownership transfer node below the first ownership transfer node corresponding to the first ownership indicator of the transfer chain. The transfer chain manager may record the identifier of the first user, the quantity attribute of the third digital content, and the fifth ownership indicator in the fifth ownership transfer node.

The central server 110 may directly or indirectly provide the fourth ownership indicator and the fifth ownership indicator to the first user. Such a method of dividing digital content having a quantity attribute may be used in cryptocurrency and the like, and in particular may be usefully used together with a dedicated ownership attribute.

Combination of digital content having quantity attributes may be performed using a similar method to the division of digital content having a quantity attribute. However, when digital content having different tracking paths are combined into a single digital content, a delivery process of the digital content is unable to be completely tracked, and thus the combination of the digital contents may be prohibited. When the combination of the digital contents is prohibited, a process of delivering the quantities of all of the digital contents may be able to be completely tracked, and thus money laundering becomes impossible.

The transfer chain according to an embodiment of the present disclosure may be configured in a tree form. According to the present disclosure, a new ownership transfer node or delivery transfer node is generated according to an ownership request or delivery request of a user. A transfer chain having a tree form may be configured by designating an upper transfer node that is immediately upper than the generated ownership transfer node or delivery transfer node, as a parent node, and designating the generated ownership transfer node or delivery transfer node as a child node. According to an embodiment, the first ownership transfer node may become an uppermost node of the transfer chain, and the second ownership transfer node generated according to the ownership request of the second user or the first delivery transfer node generated according to the delivery request of the first user may be a child node having the first ownership transfer node as a parent node, thereby forming a transfer chain relationship.

In the digital content delivery tracking method according to an embodiment of the present disclosure, information about all processes of delivering and providing digital content to a user by using a transfer chain is recorded. Accordingly, when a connection relationship between nodes that constitute the transfer chain is analyzed, a process or path of delivering the digital content may be effectively tracked. The digital content delivery tracking method using the transfer chain according to the present disclosure may be utilized in the field of online marketing. When the digital content is tracked using the transfer chain, a propagation speed (the number/time of persons to whom the digital content has been propagated) of the digital content, a propagation acceleration (whether the propagation speed increases or how much the propagation speed increases) of the digital content, and the like may be calculated, and thus may be utilized to analyze the propagation degree of the digital content. When the digital content is related to ROI such as purchase of a specific product, a conversion rate may be obtained. When the digital content has a quantity attribute, a process of dividing the digital content may be easily ascertained through tracking of transfer nodes. The central server 100 may schematically show the transfer chain or an analysis result of the transfer chain.

In the digital content delivery tracking method according to an embodiment of the present disclosure, a user authentication process is performed and an authentication result is recorded in a transfer node, and thus stealing of the digital content through copying and double use of the digital content may be addressed. Because a transfer chain according to the present disclosure is stored in a database of a central server, a processing speed may increase, and security may be enforced.

The present disclosure can be embodied as computer readable codes on a computer readable recording medium. Computer-readable recording media include all storage media such as magnetic storage media and optical reading media. It is also possible to record the data format of the message used in the present disclosure on a recording medium.

The present disclosure has been described above centering on the preferred embodiments shown in the drawings. These embodiments are not intended to limit the present disclosure, but are merely illustrative, and should be considered from an illustrative point of view rather than a restrictive point of view. The true technical protection scope of the present disclosure should be determined not by the above description but by the technical spirit of the appended claims. Although specific terms are used in the present specification, they are used only for the purpose of describing the concept of the present disclosure, and not for limiting the meaning or limiting the scope of the present disclosure described in the claims. Each operation of the present disclosure need not necessarily be performed in the order described, and may be performed in parallel, selectively or individually. Those of ordinary skill in the technical field to which the present disclosure pertains will understand that various modifications and other equivalent embodiments are possible without departing from the essential technical idea of the present disclosure claimed in the claims. It is to be understood that equivalents include not only currently known equivalents, but also equivalents to be developed in the future, namely, all components invented to perform the same function regardless of structure.

The invention claimed is:

1. A digital content delivery tracking method performed by a central server, the digital content delivery tracking method comprising:
   generating a transfer chain for first digital content in a database of the central server, wherein the generating is performed by a transfer chain manager;
   authenticating a first user, wherein the authenticating is performed by a user authenticator;
   generating a first ownership transfer node in the transfer chain, generating a first ownership indicator indicating the first digital content, recording the first ownership indicator in the first ownership transfer node, and recording an identifier of the first user obtained through the authentication of the first user in the first ownership transfer node, which are performed by the transfer chain manager, wherein the first ownership indicator is generated based on at least one of a first unique value, the identifier of the first user, browser fingerprint, media information, issuing machine information, and issuing time;

receiving by the transfer chain manager, from a second user, an ownership request based on the first ownership indicator;

authenticating the second user, wherein the authenticating is performed by the user authenticator; and generating a second ownership transfer node below the first ownership transfer node corresponding to the first ownership indicator according to the ownership request received from the second user, generating a second ownership indicator indicating the first digital content, recording the generated second ownership indicator in the second ownership transfer node, and recording an identifier of the second user obtained through the authentication of the second user in the second ownership transfer node, which are performed by the transfer chain manager, wherein the generated second ownership indicator is distinguished from the first ownership indicator by being generated based on at least one of a second unique value that is different from the first unique value, the identifier of the second user, browser fingerprint, media information, issuing machine information, and issuing time, and wherein the recording of the identifier of the second user in the second ownership transfer node is performed only when there are no lower nodes of the first ownership transfer node corresponding to the first ownership indicator or only when a dedicated ownership for the first digital content has been released.

2. A digital content delivery tracking method performed by a central server, the digital content delivery tracking method comprising:

generating a transfer chain for first digital content in a database of the central server, wherein the generating is performed by a transfer chain manager;

authenticating a first user, wherein the authenticating is performed by a user authenticator;

generating a first ownership transfer node in the transfer chain, generating a first ownership indicator indicating the first digital content, recording the first ownership indicator in the first ownership transfer node, and recording an identifier of the first user obtained through the authentication of the first user in the first ownership transfer node, which are performed by the transfer chain manager, wherein the first ownership indicator is generated based on at least one of a first unique value, the identifier of the first user, browser fingerprint, media information, issuing machine information, and issuing time;

receiving by the transfer chain manager, from the first user, a delivery request based on the first ownership indicator; and generating a second ownership transfer node below the first ownership transfer node corresponding to the first ownership indicator according to the delivery request received from the first user, generating a second ownership indicator indicating the first digital content, and recording the generated second ownership indicator in the second ownership transfer node, which are performed by the transfer chain manager, wherein the generated second ownership indicator is distinguished form the first ownership indicator by being generated based on at least one of a second unique value that is different from the first unique value, browser fingerprint, media information, issuing machine information, and issuing time, and wherein the generating of the second ownership indicator and the recording of the second ownership indicator in the second ownership transfer node is performed only when there are no lower nodes of the first ownership transfer node corresponding to the first ownership indicator.

3. The digital content delivery tracking method of claim 2, further comprising:

receiving by the transfer chain manager, from a second user, an ownership request based on the second ownership indicator;

authenticating the second user, wherein the authenticating is performed by the user authenticator; and recording an identifier of the second user obtained through the authentication of the second user in the second ownership transfer node corresponding to the second ownership indicator according to the ownership request received from the second user, wherein the recording is performed by the transfer chain manager.

4. A digital content delivery tracking method performed by a central server, the digital content delivery tracking method comprising:

generating a transfer chain for first digital content in a database of the central server, wherein the generating is performed by a transfer chain manager;

authenticating a first user, wherein the authenticating is performed by a user authenticator;

generating a first ownership transfer node in the transfer chain, generating a first ownership indicator indicating the first digital content, recording the first ownership indicator in the first ownership transfer node, and recording an identifier of the first user obtained through the authentication of the first user in the first ownership transfer node, which are performed by the transfer chain manager, wherein the first ownership indicator is generated based on at least one of a first unique value, the identifier of the first user, browser fingerprint, media information, issuing machine information, and issuing time;

receiving by the transfer chain manager, from the first user, a delivery request based on the first ownership indicator; and generating a first delivery transfer node below the first ownership transfer node corresponding to the first ownership indicator according to the delivery request received from the first user, generating a first delivery indicator indicating the first digital content, and recording the generated first delivery indicator in the first delivery transfer node, which are performed by the transfer chain manager, wherein the generated first delivery indicator is distinguished from the first ownership indicator by being generated based on at least one of a second unique value that is different from the first unique value, browser fingerprint, media information, issuing machine information, and issuing time, and wherein the generating of the first delivery indicator and the recording of the first delivery indicator in the first delivery transfer node is performed only when there are no lower nodes of the first ownership transfer node corresponding to the first ownership indicator.

5. The digital content delivery tracking method of claim 4, further comprising:
receiving by the transfer chain manager, from a second user, an ownership request based on the first delivery indicator;
authenticating the second user, wherein the authenticating is performed by the user authenticator; and
generating a second ownership transfer node below the first delivery transfer node corresponding to the first delivery indicator according to the ownership request received from the second user, generating a second ownership indicator indicating the first digital content, recording the generated second ownership indicator in the second ownership transfer node, and recording an identifier of the second user obtained through the authentication of the second user in the second ownership transfer node, which are performed by the transfer chain manager,
wherein the generated second ownership indicator is distinguished form the first ownership indicator and the first delivery indicator.

6. The digital content delivery tracking method of claim 4, further comprising:
receiving by the transfer chain manager, from the first user, a second delivery request based on the first ownership indicator after generating the first delivery transfer node; and
generating a second delivery transfer node below the first ownership transfer node corresponding to the first ownership indicator according to the second delivery request received from the first user, generating a second delivery indicator indicating the first digital content, and recording the generated second delivery indicator in the second delivery transfer node, which are performed by the transfer chain manger,
wherein the second generated delivery transfer node is distinguishable from the first delivery transfer node, and the generated second delivery indicator is distinguished from the first ownership indicator and the first delivery indicator.

7. The digital content delivery tracking method of claim 6, further comprising:
receiving by the transfer chain manager, from a third user, a second ownership request based on the second delivery indicator;
authenticating the third user, wherein the authenticating is performed by the user authenticator; and
generating a third ownership transfer node below the second delivery transfer node corresponding to the second delivery indicator according to the second ownership request received from the third user, generating a third ownership indicator indicating the first digital content, recording the generated third ownership indicator in the third ownership transfer node, and recording an identifier of the third user obtained through the authentication of the third user in the third ownership transfer node, which are performed by the transfer chain manager,
wherein the generated third ownership indicator is distinguished from the first ownership indicator, the first delivery indicator, and the second delivery indicator.

8. The digital content delivery tracking method of claim 5, wherein medium used by the first user to deliver the first digital content is recorded in the first delivery transfer node, and media information used by the second user to register ownership of the first digital content is recorded in the second ownership transfer node.

9. The digital content delivery tracking method of claim 1, wherein the recording of the identifier of the second user in the second ownership transfer node comprises performing an additional authentication procedure with respect to the second user based on the first user's permission, and
wherein the performing of the additional authentication procedure with respect to the second user based on the first user's permission comprises:
receiving a password set by the first user from the second user;
contacting the first user to obtain an approval for the second user; or
authenticating the second user by using an identifier of the second user previously received from the first user.

10. The digital content delivery tracking method of claim 1, further comprising:
receiving by the transfer chain manager, from a user, a user interface (UI) providing request based on an ownership indicator or a delivery indicator; and
providing the user with a UI allowing selection of an action function for digital content indicated by the ownership indicator or delivery indicator (hereinafter referred to as a 'base indicator') that is the basis of the UI providing request, wherein the providing is performed by the transfer chain manager.

11. The digital content delivery tracking method of claim 10, wherein the action function for the digital content comprises a content delivery function and a content providing function for the digital content indicated by the base indicator.

12. The digital content delivery tracking method of claim 10, further comprising:
receiving by the transfer chain manager, from the user, an input of selecting the action function for the digital content;
authenticating the user, wherein the authenticating is performed by the user authenticator; and
performing the selected action function with respect to the authenticated user, wherein the selected action function is performed by the transfer chain manager.

13. The digital content delivery tracking method of claim 1, further comprising:
receiving by the transfer chain manager, from a user, a content providing request based on an ownership indicator or a delivery indicator;
authenticating the user, wherein the authenticating is performed by the user authenticator;
providing the authenticated user with digital content indicated by the ownership indicator or delivery indicator (hereinafter referred to as a 'base indicator') that is the basis of the content providing request, wherein the providing is performed by the transfer chain manager; and
recording a result of providing the digital content indicated by the base indicator, together with an identifier of the authenticated user, in a transfer chain corresponding to the base indicator, wherein the recording is performed by the transfer chain manager.

14. The digital content delivery tracking method of claim 13, further comprising determining whether the digital content indicated by the base indicator is capable of being provided to the authenticated user, wherein the determining is performed by the transfer chain manager,
wherein the determining of whether the digital content indicated by the base indicator is capable of being provided comprises:

determining whether there is a lower node of a transfer node corresponding to the base indicator;

determining whether the authenticated user is a user of which an identifier has been recorded in the transfer node corresponding to the base indicator; or checking a content access attribute of the transfer node corresponding to the base indicator.

15. The digital content delivery tracking method of claim 1, wherein the first digital content has a quantity attribute, and the digital content delivery tracking method further comprises:

recording the quantity attribute of the first digital content in the first ownership transfer node, wherein the recording is performed by the transfer chain manager;

receiving by the transfer chain manager, from the first user, a division request based on the first ownership indicator; and dividing the first digital content into second digital content and third digital content that have quantity attributes according to the division request, and the dividing of the first digital content into the second digital content and the third digital content having quantity attributes comprises:

generating a fourth ownership indicator indicating the second digital content, generating a fourth ownership transfer node below the first ownership transfer node corresponding to the first ownership indicator, and recording the identifier of the first user obtained through the authentication of the first user, the quantity attribute of the second digital content, and the fourth ownership indicator in the fourth ownership transfer node; and generating a fifth ownership indicator indicating the third digital content, generating a fifth ownership transfer node below the first ownership transfer node corresponding to the first ownership indicator, and recording the identifier of the first user obtained through the authentication of the first user, the quantity attribute of the third digital content, and the fifth ownership indicator in the fifth ownership transfer node.

16. The digital content delivery tracking method of claim 15, wherein combination of digital content having quantity attributes is prohibited.

17. A central server for tracking delivery of digital content, the central server comprising:

a user authenticator configured to authenticate a first user and a second user; and a transfer chain manager configured:

to generate a transfer chain for first digital content in a database of the central server, generate a first ownership transfer node in the transfer chain, generate a first ownership indicator indicating the first digital content, record the first ownership indicator in the first ownership transfer node, and record an identifier of the first user obtained through the authentication of the first user in the first ownership transfer node, wherein the first ownership indicator is generated based on at least one of a first unique value, the identifier of the first user, browser fingerprint, media information, issuing machine information, and issuing time;

to receive from the second user, an ownership request based on the first ownership indicator;

to generate a second ownership transfer node below the first ownership transfer node corresponding to the first ownership indicator according to the ownership request received from the second user;

to generate a second ownership indicator indicating the first digital content;

to record the generated second ownership indicator in the second ownership transfer node; and to record an identifier of the second user obtained through the authentication of the second user in the second ownership transfer node, wherein the generated second ownership indicator is distinguished from the first ownership indicator by being generated based on at least one of a second unique value that is different from the first unique value, the identifier of the second user, browser fingerprint, media information, issuing machine information, and issuing time, and wherein the recording of the identifier of the second user in the second ownership transfer node is performed only when there are no lower nodes of the first ownership transfer node corresponding to the first ownership indicator or only when a dedicated ownership for the first digital content has been released.

18. A computer program stored in a non-transitory recording medium to execute the digital content delivery tracking method of claim 1 in a computer.

19. The digital content delivery tracking method of claim 1, further comprising:

receiving by the transfer chain manager, from the first user, a delivery request based on the first ownership indicator; and generating a child node below the first ownership transfer node corresponding to the first ownership indicator according to the delivery request received from the first user, generating a new indicator indicating the first digital content, and recording the generated new indicator in the generated child node, which are performed by the transfer chain manager, wherein the generated new indicator is distinguished from the first ownership indicator.

20. The digital content delivery tracking method of claim 19, further comprising:

receiving by the transfer chain manager, from a second user, an ownership request based on the new indicator;

authenticating the second user, wherein the authenticating is performed by the user authenticator; and recording by the transfer chain manager, the second user as an owner of the first digital content in the transfer chain based on the ownership request received from the second user and the identifier of the second user obtained through the authentication of the second user.

* * * * *